United States Patent [19]
Macks

[11] Patent Number: 5,874,790
[45] Date of Patent: Feb. 23, 1999

[54] METHOD AND APPARATUS FOR A PLURALITY OF MODULES TO INDEPENDENTLY READ A SINGLE SENSOR

[75] Inventor: Harold Ryan Macks, Detroit, Mich.

[73] Assignee: Ford Motor Company, Dearborn, Mich.

[21] Appl. No.: 839,931

[22] Filed: Apr. 18, 1997

[51] Int. Cl.$^6$ .................................................. H04J 3/06
[52] U.S. Cl. ...................... 307/141.4; 307/140; 327/365; 327/403; 327/415
[58] Field of Search .................................. 307/141.4, 116, 307/125, 130, 140, 117; 327/415, 365, 403; 123/523, 691; 340/310.05

[56] References Cited

U.S. PATENT DOCUMENTS

| | | | |
|---|---|---|---|
| 3,183,364 | 5/1965 | Pickering | 327/417 |
| 3,459,968 | 8/1969 | Kraus | 327/415 |
| 4,107,666 | 8/1978 | Ward | 340/331 |
| 4,532,433 | 7/1985 | Basile | 327/417 |
| 4,571,508 | 2/1986 | Koga et al. | 327/78 |
| 5,132,968 | 7/1992 | Cephus | 370/349 |
| 5,140,302 | 8/1992 | Hara et al. | 340/449 |
| 5,143,452 | 9/1992 | Maxedon et al. | 374/170 |
| 5,272,457 | 12/1993 | Heckaman et al. | 327/403 |
| 5,553,489 | 9/1996 | Connel et al. | 73/118.1 |
| 5,635,896 | 6/1997 | Tinsley et al. | 340/310.05 |

*Primary Examiner*—Albert W. Paladini
*Attorney, Agent, or Firm*—Paul K. Godwin

[57] ABSTRACT

Two electronic modules are connected to share and to independently read the sensed value from a single environmental sensor element, by communicating between each other when a particular module is reading the sensor output signal. The sensor output signal is a function of the value of the reference voltage being applied by the reading module and the characteristics of the environment being sensed. A module provides a toggle signal when it completes its reading of the sensor so that the other (non-reading) module will know when it may apply its reference voltage to the sensor and complete its reading of the sensor. The modules alternate the reading of the sensor in order to eliminate the need for a plurality of corresponding sensors.

8 Claims, 1 Drawing Sheet

METHOD AND APPARATUS FOR A PLURALITY OF MODULES TO INDEPENDENTLY READ A SINGLE SENSOR

FIELD OF THE INVENTION

The present invention is related to the field sensor reading and more particularly to the area of utilizing a single sensor that is readable by separate electronic modules.

BACKGROUND OF THE INVENTION

It is often the case that in systems which include separate electronic modules that require accurate information from an environmental sensor, such as a temperature or humidity sensor, each module reads its own separate sensor. This is usually due to the fact that a calibrated reference voltage must be applied to the sensor in order to interrogate the sensed information. However, the reference voltages from the individual modules may have slightly different values at the sensor. These differences may be the result of many causes, including, for instance, the unique characteristics of the individual module circuitry or the voltage drop that occurs between the module and the sensor due to wiring and connectors. On the other hand, a single reference voltage applied to a common sensor may be slightly different from the reference voltage used by a module and therefore produce an erroneous sensor measurement to that module. Therefore, the use of a dedicated sensor with each module is the conventional way to obtain the most accurate sensor information.

In the manufacture of automotive vehicles, the use of separate sensors that detect the same environmental information, such as ambient air temperature, is a duplication that is costly. It would, of course, be desirable to eliminate such duplication and maintain the accuracy afforded by conventional practice.

SUMMARY OF THE INVENTION

The present invention overcomes the problems mentioned above by providing an apparatus and a method by which a single sensor can be independently energized and read by separate electronic modules. The apparatus includes a sensor device that provides an output signal that is a function of an input voltage and the environmental characteristics the sensor is designed to sense. It also includes a first module containing an input/output (I/O) port for controllably providing that module's own reference voltage as an input to the sensor, an analog port for monitoring the output signal from the sensor and means for switching the I/O port between that module's reference voltage, a ground reference and a high impedance input at predetermined intervals in accordance with the sequence of signal levels present at its analog port. The apparatus further includes a second module containing an I/O port for providing that module's own reference voltage as an input to the sensor, an analog port for monitoring the output signal from the sensor and means for switching the I/O port between that module's reference voltage, a ground reference and a high impedance input at predetermined intervals in accordance with the sequence of signal levels present at its analog port.

At power-up, the apparatus operates by a method in which the sensor is read by having the switching means of the first module output the first module reference voltage to the sensor for a predetermined period of time. After a brief stabilization period, the first module reads the output signal from the sensor at its analog port. When finished reading the sensor output signal, the first module toggles its I/O port sequentially to a ground state, to the reference state, to ground over a relatively short period of time. After toggling, the first module switches its I/O port to a high impedance level so as not to affect the subsequent reading by the second module.

The second module senses the toggle sequence by the first module at its analog port immediately causes its reference signal to be applied to the sensor for a predetermined period of time. After waiting a brief time period for the sensor to stabilize following application of the reference voltage, the second module reads the sensor output at its analog port. When finished reading the sensor output signal, the second module toggles its I/O port sequentially to a ground state, to the reference state and ground over a relatively short period of time. After toggling, the second module switches its I/O port to a high impedance level so as not to affect the subsequent reading by the first module.

The first module, after sensing the occurrence of toggling by the second module, immediately applies its first module reference voltage to the sensor prior to reading the sensor output signal. These steps are alternately repeated by the modules in order to independently read and thereby share the same sensor.

DETAILED DESCRIPTION OF THE INVENTION

Figure 1:
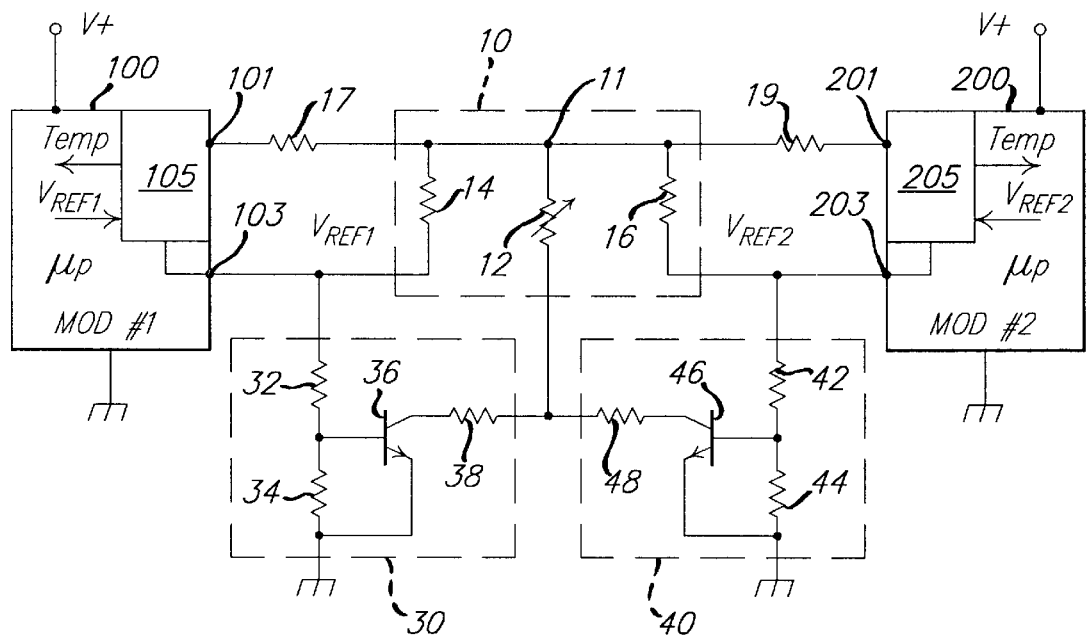
FIG. 1 is a schematic drawing of the sensor and modules which comprise a preferred embodiment of the invention.

In FIG. 1, a sensor 10 is shown connected to two electronic modules 100 and 200. The sensor in this embodiment includes a temperature sensitive variable resistor 12 that has one of its two terminals connected to a junction 11 between resistors 14 and 16. The other terminal of variable resistor 12 is connected to a ground reference circuit that will be more fully explained below.

Modules 100 and 200 are typical of modules used in automotive vehicles, such as a heating, ventilation and air conditioner (HVAC) control module and a digital thermometer control module. In each case, modules 100 and 200 are configured to have respective analog ports 101 and 201 and binary input/output (I/O) ports 103 and 203. Resistor 17 is connected between analog port 101 and sensor 10. Resistor 19 is connected between analog port 201 and sensor 10. Resistors 17 and 19 are connected to junction 11 of sensor 10.

A powered module 100 provides either a ground level (zero value) or a predetermined reference voltage VREF 1 to its I/O port 103 through a switching circuit 105, when in its output state. When in its input state, the I/O port is switched by the switching circuit 105 to a high impedance value, so as not to adversely influence the readings by the second module. Similarly, a powered module 200 provides either a ground level (zero value) or a predetermined reference voltage VREF 2 to its I/O port 203 through a switching circuit 205 when in its output state, and a high impedance level when in its input state. (Typically, modules 100 and 200 are microprocessor controlled circuits that are programmed to perform several different operations. Other logic circuits also may be used for certain applications as control modules. The representations found in the figures only deal with those portions of modules 100 and 200 that are used to interrogate and monitor the output of the sensor 10.)

The means of providing a voltage reference, ground, or high impedance from a single node is embodied in most microcomputers. The HC11E9 MCU from Motorola has bi-directional input/output pins which can be configured, under software control, to be either a voltage reference, ground, or high impedance. When the input/output put pin is configured as an output, the HC11E9 can, under software control, provide either a ground or a voltage reference. When reconfigured as an input, under software control, the pin now neither sinks nor sources current and therefore is high impedance with respect to the rest of the circuit.

A first ground reference switch circuit 30 comprises a transistor 36 and resistors 32, 34 and 38. Resistor 32 is connected between I/O port 103 and the base of transistor 36. Resistor 34 is connected between the base of transistor 36 and a ground reference, closely associated with the ground connection of module 100. Resistor 38 is connected between the ground terminal of variable resistor 12 of sensor 10 and the collector of transistor 36.

A second ground reference switch circuit 40 comprises a transistor 46 and resistors 42, 44 and 48. Resistor 42 is connected between I/O port 203 and the base of transistor 46. Resistor 44 is connected between the base of transistor 46 and a ground reference, closely associated with the ground connection of module 200. Resistor 48 is connected between the ground terminal of variable resistor 12 of sensor 10 and the collector of transistor 46.

At start-up, module 100 applies reference voltage VREF 1 through I/O port 103. Upon application of VREF 1, transistor 36 of ground switch 30 becomes biased to a conductive state. The voltage divider formed by resistor 14, variable resistor 12 and resistor 38 is connected to conduct current and drop proportionate voltages across each resistor. The voltage level present at junction 11 is sensed through resistor 17 at analog port 101 and, when stabilized, is interpreted by module 100 as the sensor output signal, for appropriate use therein. The voltage drop across resistor 12 and the voltage present at analog port 101 is a function of the ambient temperature present at variable resistor 12, its resulting resistance value and the value of VREF 1. Since all other resistance's in that circuit are substantially constant, the voltage present at analog port 101 can be compared with predetermined values of temperature stored in the module in order to determine an accurate measurement. Of course, if the value of VREF 1 were to vary within module 100, that variation can be monitored and factored into the temperature measurements.

Following the reading of the sensor signal, the module 100 causes I/O port 103 to be switched from the VREF 1 level, to ground, to VERF1, and ground again as a toggle sequence to signal an end to its reading of the sensor 10.

Upon detecting the toggle sequence from module 100 on its analog port 201, module 200 outputs reference voltage VREF 2 through I/O port 203. Upon application of VREF 2, transistor 46 of ground switch 40 becomes biased to a conductive state. The voltage divider formed by resistor 16, variable resistor 12 and resistor 48 is connected to conduct current and drop proportionate voltages across each resistor. After a short period to allow for stabilization, the voltage level present at junction 11 is sensed through resistor 19 at analog port 201 and interpreted by module 200 as the sensor output signal for appropriate use therein. The voltage drop across resistor 12 and the voltage present at analog port 201 is a function of the ambient temperature present at variable resistor 12, its resulting resistance value and the value of VREF 2. Since all other resistance's in that circuit are substantially constant, the voltage present at analog port 201 can be compared with predetermined values of temperature stored in module 200 in order to determine an accurate measurement. Of course, if the value of VREF 2 were to vary within module 200, that variation can be monitored and factored into the temperature measurements.

Following the reading of the sensor signal, the module 200 causes the I/O port 203 to be switched from the VREF 2 level, to ground, to VERF2, and ground again as a toggle sequence to signal an end to its reading of the sensor 10.

Figure 2:
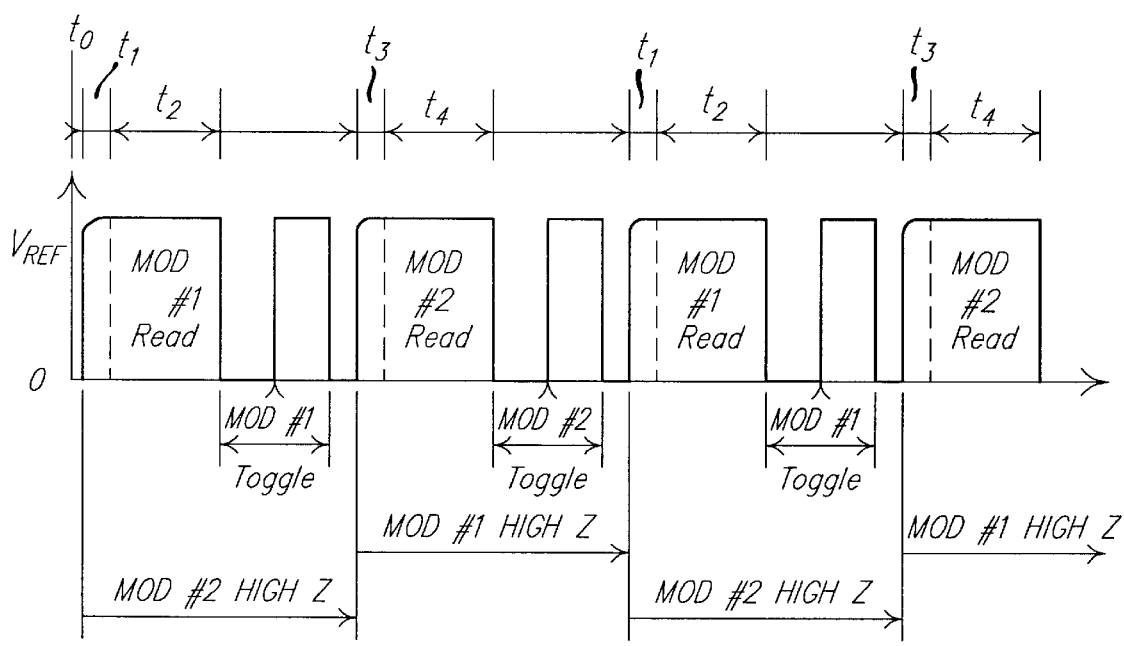
FIG. 2 is a waveform diagram illustrating the time periods over which the reference voltages from the two modules are applied to the common sensor shown in the preferred embodiment of the invention.

FIG. 2 contains a waveform showing the sequence in which the reference voltages from the two modules are applied to sensor 10 in a way that modules 100 and 200 can independently read and share the single sensor. The voltage levels are indicated as binary levels at either "0" (ground) reference level or at a "1", a generic but elevated voltage VREF. It should be understood that FIG. 2 does not represent actual voltage values at the various terminals and ports, but rather is intended to illustrate the sequence in which modules 100 and 200 apply and read the various voltages in order to share the same sensor 10.

At power-up, module 100 (represented as "MOD#1" in FIG. 2) switches I/O port 103 from a high impedance input state to its reference voltage for a predetermined period of time t1+t2. Time period t1 is long enough to overcome the time constant required to allow the voltage at analog port 101 to become stable. This time constant is predetermined and stored in module 100 as t1. Time period t2 is set to sufficient length to allow a stable analog read of the sensor 10. After a short stabilization period t1, module 100 reads the sensor output signal at analog port 101 for a period t2. The sensor output signal is a function of the value of the reference voltage VREF 1 and the resistance value of the sensor variable resistor 12. Following the MOD#1 read period t2, the switching circuit 105 "toggles" the I/O port 103 with a short off/on/off application of ground level, reference voltage VREF 1 and ground. Immediately after completing the toggle, the switching circuit 105 switches the I/O port to its input state, which is at a high impedance level. Module 100 monitors the value of voltage present at the analog port 101 to determine when it may again read the sensor output signal after sensing a toggle signal from module 200.

During the time module 100 is reading the sensor output signal, module 200 is also monitoring the voltage levels present at its analog port 201, but is not reading those levels as a sensor output signal. Rather, after module 200 senses the toggle from module 100 at its analog port 201 it switches its I/O port 203 from its high impedance input state to output reference voltage VREF 2 and waits for a third predetermined period of time t3, to allow for the sensor signal to stabilize. Module 200 then reads the sensor output signal for a fourth predetermined period of time t4 (represented as "MOD#2" in FIG. 2). After the t3 period, the module 200 reads the sensor signal present at its analog port 201 for the MOD#2 read period t4. Following the MOD#2 read period, the switching circuit 205 "toggles" the I/O port 203 with a short off/on/off application of ground level, reference voltage VREF 2 and ground. Shortly after completing the toggle, the switching circuit 205 switches the I/O port to its input state, which is at a high impedance level. Module 200 monitors both the value of voltage present at the analog port

201 to determine when it may again read the sensor output signal after sensing a toggle signal from module 100.

Of course, when module 200 provides its toggle signal sequence, module 100 senses that the sensor is again available and immediately outputs the reference voltage VREF 1 on its I/O port 103. After waiting for the short stabilization period t1, the module reads the sensor signal present on the analog port 101 for the second predetermined period of time t2, and the cycle of toggle and read continues to alternate between the modules.

It should be understood that the present invention described herein is illustrative. The terminology used is intended to be in the nature of words of description rather than limitation. It should be understood that many modifications and variations of the present invention are possible in light of the above teachings. Therefore, it is believed that, within the scope of the appended claims, the present invention may be practiced otherwise than as specifically described.

I claim:

1. A system for allowing a plurality of electrical modules that require information from an environmental sensor to independently access and read the same sensor, comprising:

a sensor device that provides an output signal in response to an input voltage and the environmental characteristics it is designed to sense;

a first module containing a first input/output port for outputting its own first reference voltage as an input voltage to said sensor, a first analog port for monitoring the output signal from said sensor and a first means for switching said first input/output port between at least said first reference voltage, a ground reference and a high impedance at predetermined intervals;

a second module containing a second input/output port for providing its own second reference voltage as an input to said sensor, a second analog port for monitoring the output signal from said sensor and a second means for switching said second input/output port between said second reference voltage, a ground reference and a high impedance at predetermined intervals;

said first module being configured to cause said first switching means to provide said first reference voltage to said sensor, to read the resulting sensor output signal at said first analog port during the time said first reference voltage is provided, and to subsequently provide a first toggle signal at said first input/output port by alternately switching said first input/output port between said first reference voltage and ground reference to signal said first module's cessation of reading said sensor and, following the cessation of said first toggle signal, to switch said first input/output port to said high impedance; and said second module being configured to sense said first toggle signal at its second analog port, responsively cause said second switching means to provide said second reference voltage to said sensor, to read the resulting sensor output signal at said second analog port during the time said second reference voltage is provided, and to subsequently provide a second toggle signal at said second input/output port by alternately switching said second input/output port between said second reference voltage and around reference and, following the cessation of said second toggle signal, to switch said second input/output port to said high impedance.

2. A system as in claim 1, wherein said first module switching means causes said first reference signal to be output to said sensor for a predetermined period of time after it senses the second toggle signal and when no output signal is measured at said analog port that is attributed to said second module.

3. A system as in claim 1, wherein said sensor device includes a first dropping resistor, a second dropping resistor and a variable resistor, wherein said sensor device changes its resistance value according to the temperature of the environment in which it is located, and further wherein said first dropping resistor being connected between said first input/output terminal and a first terminal of said variable resistor, and said second dropping resistor being connected between said second input/output terminal and said first terminal of said variable resistor.

4. A system as in claim 3, wherein said first and second analog ports are each connected to sense the voltage drop across said variable resistor as the sensor output signal.

5. A system as in claim 4, wherein said variable resistor has a second terminal adapted to be connected to a ground reference, and said sensor output signal has a value that corresponds to the voltage dropped across said variable resistor.

6. A system as in claim 5, wherein said first and second modules each contain further means for switching the ground side of said sensor device to a corresponding module ground reference when said first and second reference voltages are respectively applied to said sensor.

7. A system as in claim 5, further including a first ground switching circuit that is connected to be responsive to the application of said first reference voltage to concurrently ground a second terminal of said variable resistor to a ground that is electrically identical to the ground reference of said first module, during said application of said first reference voltage.

8. A system as in claim 7, further including a second ground switching circuit that is connected to be responsive to the application of said second reference voltage to concurrently ground said second terminal of said variable resistor to a ground that is electrically identical to the ground reference of said second module, during said application of said second reference voltage.

* * * * *